UNITED STATES PATENT OFFICE.

ALEXANDER WHITELAW, OF GLASGOW, SCOTLAND.

TREATING BRINE AND SALTED MEATS TO REMOVE THE SALT.

Specification forming part of Letters Patent No. 42,988, dated May 31, 1864.

*To all whom it may concern:*

Be it known that I, ALEXANDER WHITELAW, of Glasgow, in the county of Lanark, Scotland, have invented an Improved Process for Treating Brine and Salted Meats to Remove the Salt, of which the following is a specification.

This invention consists in subjecting brine from salted flesh or fish to the dialytic process in such a manner that the salt or saline matter, or a large portion thereof, are separated from the kreatine and other nutritive constituents of the flesh kept in solution in the brine, and that the juices thus separated may be manufactured into various products of a highly nutritive, palatable, and wholesome character, and admirably adapted for use in hospitals, at sea, or by an army in the field.

In practically carrying out my invention the brine—such, for example, as is produced in salting beef, mutton, or pork—is subjected to the process known to chemists as "dialysis," and respecting which existing information is mainly due to recent elaborate and searching investigations of Professor Graham, of the London Mint. The process of dialysis takes place when a fluid mixture of so-called "colloid" and "crystalloid" substances is on one side of a suitable membrane or diaphragm which has water at its other side. Under these circumstances the crystalloid substances, or a large portion of them, pass through the diaphragm into the water, leaving behind the colloid substances. Brine is a mixture of colloid juices and crystalloid salts, which I find can be separated sufficiently and satisfactorily by this process of dialysis.

The membrane or material by means of which the dialytic separation is effected may be a soft substance of close texture—such as parchment paper, vellum, bladder, skin, or other animal membrane—or a soft gelatinous substance combined with a woven fabric, or, again, a porous material—such as porous earthenware—having the pores filled with size or the like gelatinous substance. Moist clay or other suitable plastic material may also be used in forming dialytic partitions or envelopes.

It is most convenient in applying the process of dialysis for the purposes of my invention to put the brine into vessels which can be immersed in water in a tank or stream, such vessels being formed entirely or for the most part of dialytic material, and being termed "dialyzers." A vessel of large size may be conveniently formed with an open frame-work of wood or metal, and with sheets of skin or the like dialytic material stretched over the openings and fixed to the frames in such a way as to be water-tight. I find a series of common bladders fitted with stop-cocks or with gutta-percha necks and plugs and hung upon rods which are laid across within the vats or tanks of water form a very cheap and effectual arrangement. Bags of larger size may also be employed being made of the skins of animals, and such bags may either be used open, or they may be fitted with stop-cocks or with metal or other necks and covers.

In conducting operations with the brine, and using, for example, the bladder arrangement hereinbefore described, the bladders are nearly but not quite filled with the previously-filtered brine by means of funnels or fillers, and, their stop-cocks or plugs being closed, they are arranged in rows suspended from rods and immersed in vats of water. The water in these vats is renewed once or twice a day, or oftener, and at the end of the third or fourth day the bladders may be taken out, when it will be found that the greater part of the niter and common salt has been removed, and that the liquid remaining in the bladders is pure or nearly pure juice of flesh in a fresh and highly-nutritive condition.

The purified juice in the state in which it comes from the dialyzers may be at once employed in making rich and palatable soups; or it may be evaporated to the state of solid extract of flesh. By one plan I evaporate the purified juice, by preference in enameled vessels, at a temperature of 212° Fahrenheit, to dryness or to a thick state, and I pack it in tins or jars for the market. By another plan I concentrate the purified juice at a temperature of about 120° Fahrenheit by means of a vacuum-pan or other convenient arrangement, and thereby get all the ingredients of the juice in a soluble condition. By another plan I evaporate the purified juice to a more or less concentrated fluid or semi-fluid condition, in which I combine it with wheat-flour or other farinaceous ingredient, and thereby form "meat-biscuit." This biscuit may be ground and packed in tins for the market. The purified juice may also be otherwise utilized. Thus albumen may be obtained from it by well-known means. Fish-brine can be treated in the same way as that from flesh.

It is not essential for the water outside of the dialyzer to be quite pure and free from salt, as the dialytic action will take place with saline water if somewhat less saline than the brine, but of course with proportionately less energy. Thus the operation may be conducted in sea-water, and on board ships at sea the brine from salt meat may be profitably used up and be made to restore to the meat a great part of the nutritive matter drawn from it by the salting action; or the operation may be partly conducted in sea-water and then completed in fresh or distilled water.

An important application of my improved treatment of brine is effected in connection with the steeping of salt meat, which is commonly done to remove salt prior to cooking the meat. In this application I employ a dialyzer of a sufficient size to contain one or more pieces of salt meat along with a quantity of brine, in which brine the meat is steeped. On the dialyzer, with its contained meat and brine, being immersed in water, and on the saltness of the brine becoming partly reduced, the salt from the meat passes into the brine and then out of the dialyzer, and the action may be continued until almost the whole salt is removed from the meat and from the juice surrounding it. A further important action also takes place: As the salt leaves the meat and its contractile action becomes diminished the meat re-expands and reabsorbs the nutritive ingredients from the brine, having its quality thereby considerably enriched, and being restored more nearly to the condition of fresh meat.

In carrying out my invention I do not wish to confine myself to the precise details herein described, as the dialytic process may be applied to the brine from salted flesh or fish in various ways; but,

Having thus fully described my invention, what I claim as new, and desire to secure by Letters Patent, is—

The application to the brine from salted flesh and fish of the process known as "dialysis," substantially in the manner set forth, so that the nutritive constituents of the brine are separated from the saline matters, and can be used as set forth.

In testimony whereof I have signed my name to this specification in the presence of two subscribing witnesses.

ALEXANDER WHITELAW.

Witnesses:
 EDMUND HUNT,
 STEPHEN ALLEY,
  *Both of Glasgow.*